J. Storer,

Lubricator.

No. 2,890. Reissued Mar. 3, 1868.

Witnesses.

J. H. Coombs.

A. Leclerc.

Inventor.

John Storer.

N. PETERS, PHOTO-LITHOGRAPHER, WASHINGTON, D. C.

UNITED STATES PATENT OFFICE.

JOHN STORER, OF NEW YORK, N. Y.

IMPROVEMENT IN LUBRICATORS FOR STEAM-ENGINES.

Specification forming part of Letters Patent No. 53,195, dated March 13, 1866; Reissue No. 2,890, dated March 3, 1868.

*To all whom it may concern:*

Be it known that I, JOHN STORER, of the city, county, and State of New York, have invented a new and useful Improvement in Lubricators; and I do hereby declare the following to be a full, clear, and exact description of the same, sufficient to enable others skilled in the art to which it appertains to make and use the same, reference being had to the accompanying drawings, which are made a part of this specification.

This invention relates to lubricators for the use either of oil, or of tallow, or suet.

It consists in a novel construction of and mode of packing and securing the removable cap or valve.

Figure 1:
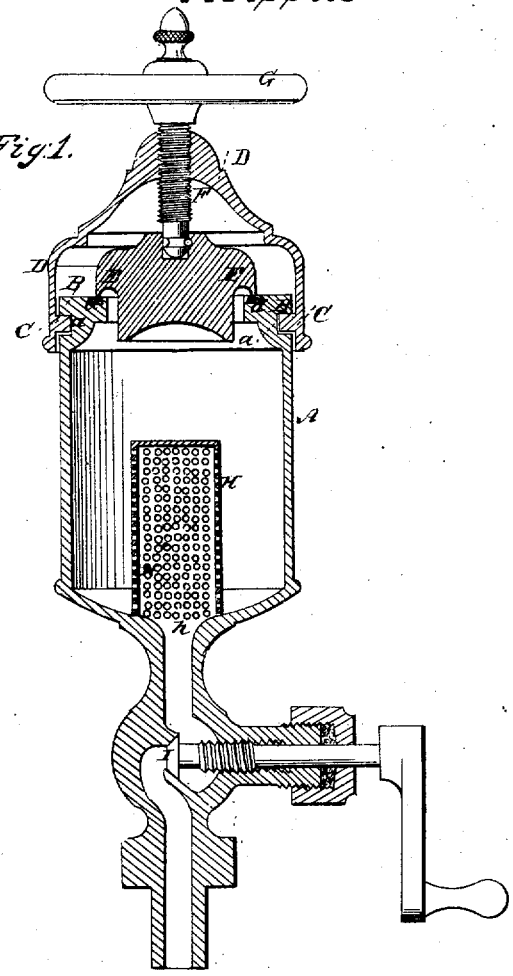
Figure 3:
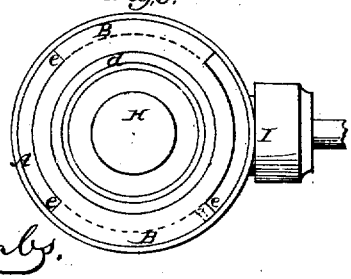
Figure 2:
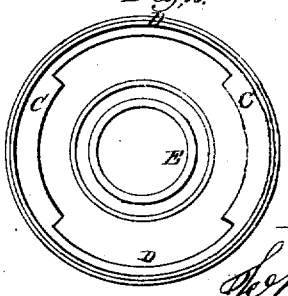

In the drawings, Figure 1 is a central, vertical section of a lubricator constructed according to my invention. Fig. 2 is an inverted plan of the cover of same, and Fig. 3 is a plan view of the cup with the cover removed.

Similar letters of reference indicate corresponding parts in the several figures.

A represents the cup or reservoir of the lubricator. This cup is attached at the bottom to the steam-cylinder or other part of the engine or apparatus to be lubricated, having a valve or cock, I, interposed to regulate the supply of lubricating material.

D is the removable external cap or cover, which gives a finish to the upper part of the instrument and forms the abutment for the screw F, which is turned by a hand-wheel, G, or other suitable handle, and which operates an inner lid or valve, E, by which the top of the cup or reservoir is closed steam and air tight.

The cup A is formed near its upper end, with an annular groove, *a*, and the projection or flange B above this groove is provided with openings *e e*, Fig. 3, for the passage of the projections C C, Figs. 1 and 3, formed inside of the removable cap D. By placing the cap on the top of the cup with the projections C C opposite the openings *e e* and dropping it down to bring the projections C C into the groove *a a*, and then turning the cap a short distance to bring the said projections under the flange B and against a stop, *b*, Fig. 3, in the groove *a*, the cap is attached to the cup. The screw F passes through a threaded opening in the center of the cap D, and is attached to the inner lid or valve E in such a manner that while the said lid or valve will be removed and replaced with the cap D the screw may turn freely in it. The top of the cup A is provided with a ring, *d*, of soft metal, which may be secured in an annular groove in said top, to form a seat on which the lid or valve E may be made to fit perfectly air and steam tight.

To remove the cap D and air steam tight lid or valve E it is first necessary to give a partial turn backward to the screw for the purpose of loosening the cap D, then to turn the cap till the projections C C come opposite the openings *e e* in the top flange and lift off the cap. When the cap has been put on again and turned to bring the projections C C under the flange B, a slight turn of the screw secures the cap and at the same time brings the lid or valve E tight on its seat. This removal and replacement of the cap and lid can be effected more expeditiously than the removal and replacement of any of the covers in common use on lubricators.

H is a perforated cylinder arranged in the center of the lower part of the cup A over the outlet-opening. The perforations in the cylinder are small, but so numerous that their aggregate area is equal to that of the full opening of the valve I, yet they will not allow the lubricating material to pass them in bulk, and will prevent any choking up of the outlet-passage.

The periphery of the cylinder may, if desired, be covered with cloth, lamp-wick, or other fibrous material, to strain and graduate the lubricating operation. The cylinder is better adapted for the application of such fibrous strainer or percolator than any other form of perforated surface.

Having thus described my invention, the following is what I claim as new therein and desire to secure by Letters Patent:

A lubricator for steam-engines, having a movable cap or valve, E, and a screw, F, to secure the said cap or valve in position, so arranged that the screw can turn without carrying the said cap or valve around with it, in combination with a soft-metal ring for making a tight joint between the cap or valve and the body of the lubricator, all substantially as and for the purposes specified.

To the above specification of my improvement in lubricators for steam-engines I have signed my hand this 4th day of December, A. D. 1867.

JOHN STORER.

Witnesses:
OCTAVIUS KNIGHT,
J. E. M. BOWEN.